165-104.32 S+
-/3/87 D3 RE 32,434

United States Patent [19]

Avrea

[11] E Patent Number: Re. 32,434

[45] Reissued Date of Patent: Jun. 9, 1987

[54] METHOD AND APPARATUS FOR AUTOMATICALLY REFILLING A LEAKING LIQUID COOLING SYSTEM AS AN ENGINE OPERATES BY UTILIZING A RADIATOR AND A REMOTE COOLANT RESERVOIR

[76] Inventor: Walter C. Avrea, 1405 Whalers Way, Tempe, Ariz. 85283

[21] Appl. No.: 733,752

[22] Filed: May 13, 1985

Related U.S. Patent Documents

Reissue of:

[64] Patent No.: 4,461,342
Issued: Jul. 24, 1984
Appl. No.: 372,915
Filed: Apr. 29, 1982

[51] Int. Cl.[4] ..... F01P 11/02; F28D 15/00

[52] U.S. Cl. ..... 165/104.32; 165/51; 123/41.54

[58] Field of Search ..... 165/104.32, 104.31, 165/DIG. 24; 123/41.44, 41.51, 41.54, 41.27

[56] References Cited

U.S. PATENT DOCUMENTS

| | | | |
|---|---|---|---|
| 3,132,634 | 5/1964 | Butler | 165/104.32 |
| 3,601,181 | 8/1971 | Avrea | 165/104.32 |
| 3,820,593 | 6/1974 | Pabst | 165/104.32 |
| 3,981,279 | 9/1976 | Bubniak et al. | 123/41.14 |
| 4,006,775 | 2/1977 | Avrea | 165/104.32 |

*Primary Examiner*—Albert W. Davis, Jr.
*Attorney, Agent, or Firm*—Don J. Flickinger; Jordan M. Meschkow

[57] ABSTRACT

A coolant reservoir is physically spaced apart from and elevated above the lower surface of an engine cooling system radiator. A coolant transfer conduit permits excess coolant to be transferred from the radiator into the coolant reservoir. A first one way check valve prevents fluid flow from the radiator into the reservoir unless the pressure within the cooling system exceeds a predetermined maximum value. A coolant refill conduit provides a coolant flow path between the reservoir and the radiator. A second one way check valve is coupled in series with the coolant refill conduit and permits coolant to flow from the reservoir into the radiator when the engine cooling system pressure drops below a predetermined value.

36 Claims, 9 Drawing Figures

METHOD AND APPARATUS FOR AUTOMATICALLY REFILLING A LEAKING LIQUID COOLING SYSTEM AS AN ENGINE OPERATES BY UTILIZING A RADIATOR AND A REMOTE COOLANT RESERVOIR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to liquid cooling systems for internal combustion engines, and more particularly, to engine cooling systems having a coolant reservoir spaced apart from the radiator.

2. Description of the Prior Art

U.S. Pat. No. 4,006,775 (Avrea) discloses an automatic, positive anti-aeration system which is coupled to a specially designed radiator of an engine cooling system and functions as an integral part of that radiator. One of the primary objects of the invention disclosed in this patent is to provide a combination radiator-/automatic positive anti-aeration system in which the components are assembled to function cooperatively as an integral unit in which external plumbing is either entirely eliminated or reduced to a minimum.

FIGS. 7 and 12 of the Avrea patent disclose embodiments of his invention which enable a conventional cooling system to be modified to operate in accordance with the teachings of his patent. These two cooling system modifications require that the existing engine radiator be removed from the vehicle, physically disassembled, reduced in width, reassembled and reinstalled in the vehicle. A vertically disposed coolant reservoir includes at least one specially designed, internally mounted check valve.

Because of the numerous steps involved in modifying an existing engine cooling system in accordance with the teachings of the Avrea patent, the cost of such a cooling system modification is substantial. An important disadvantage of such a modification is that the frontal area and overall size of the radiator so modified is significantly reduced. This radiator size reduction reduces the thermal cooling capacity of the system and the amount of coolant circulating in the system. A modification of this type may void the manufacturer's engine warranty. The high cost of such a modification and the adverse effect on cooling system performance may have a significant effect on the acceptance of such a cooling system modification.

Since the operating principles of the cooling system disclosed in the Avrea patent are relevant to the operation of the invention disclosed herein, U.S. Pat. No. 4,006,775 is hereby incorporated by reference.

SUMMARY OF THE INVENTION

It is therefore a primary object of the present invention to readily convert an existing engine cooling system having a radiator into a system capable of automatically refilling itself as the engine operates.

Another object of the present invention is to provide an automatically refillable liquid cooling system which increases the effective system coolant capacity by enabling coolant stored in a coolant reservoir to be transferred from the reservoir into the engine cooling system as the engine operates.

Yet another object of the present invention is to provide an automatically refillable engine cooling system which provides visual and audible warnings of a low coolant condition before the engine overheats.

Still another object of the present invention is to provide an automatically refillable engine cooling system which utilizes high pressure and low pressure one way check valves fabricated from completely interchangable component parts.

Still another object of the present invention is to provide an automatically refillable engine cooling system capable of converting a conventional vehicular cooling system into an automatically refillable system without modifying the existing cooling system radiator.

Still another object of the present invention is to provide an automatically refillable engine cooling system which utilizes two externally located one way check valves which can be readily disassembled to permit any single element of the check valve structure to be replaced.

Still another object of the present invention is to provide an automatically refillable engine cooling system utilizing a pair of one way check valves which are manufactured from a limited number of durable but inexpensive component parts.

Briefly stated, and in accord with one embodiment of the invention, an automatically refillable engine cooling system includes a radiator including means coupled between the radiator and the engine to transfer coolant between the radiator and the engine. The engine cooling system further includes a coolant reservoir physically spaced apart from the radiator which contains a reserve supply of coolant. A coolant transfer conduit permits coolant to be transferred from the engine cooling system into the reservoir. A first one way check valve is coupled in series with the fluid flow path from the cooling system through the coolant transfer conduit into the coolant reservoir to permit fluid flow from the engine cooling system into the reservoir when the pressure within the cooling system exceeds a predetermined maximum value. A coolant refill conduit provides fluid communication between a low point in the coolant reservoir and the engine cooling system. A second one way check valve is coupled in series with the coolant refill conduit to permit fluid flow from the coolant reservoir into the engine cooling system when the pressure differential across the second check valve exceeds a predetermined value.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to illustrate the advantages of the invention and its contributions to the art, a preferred hardward embodiment of the invention will now be described in some detail.

Figure 1:
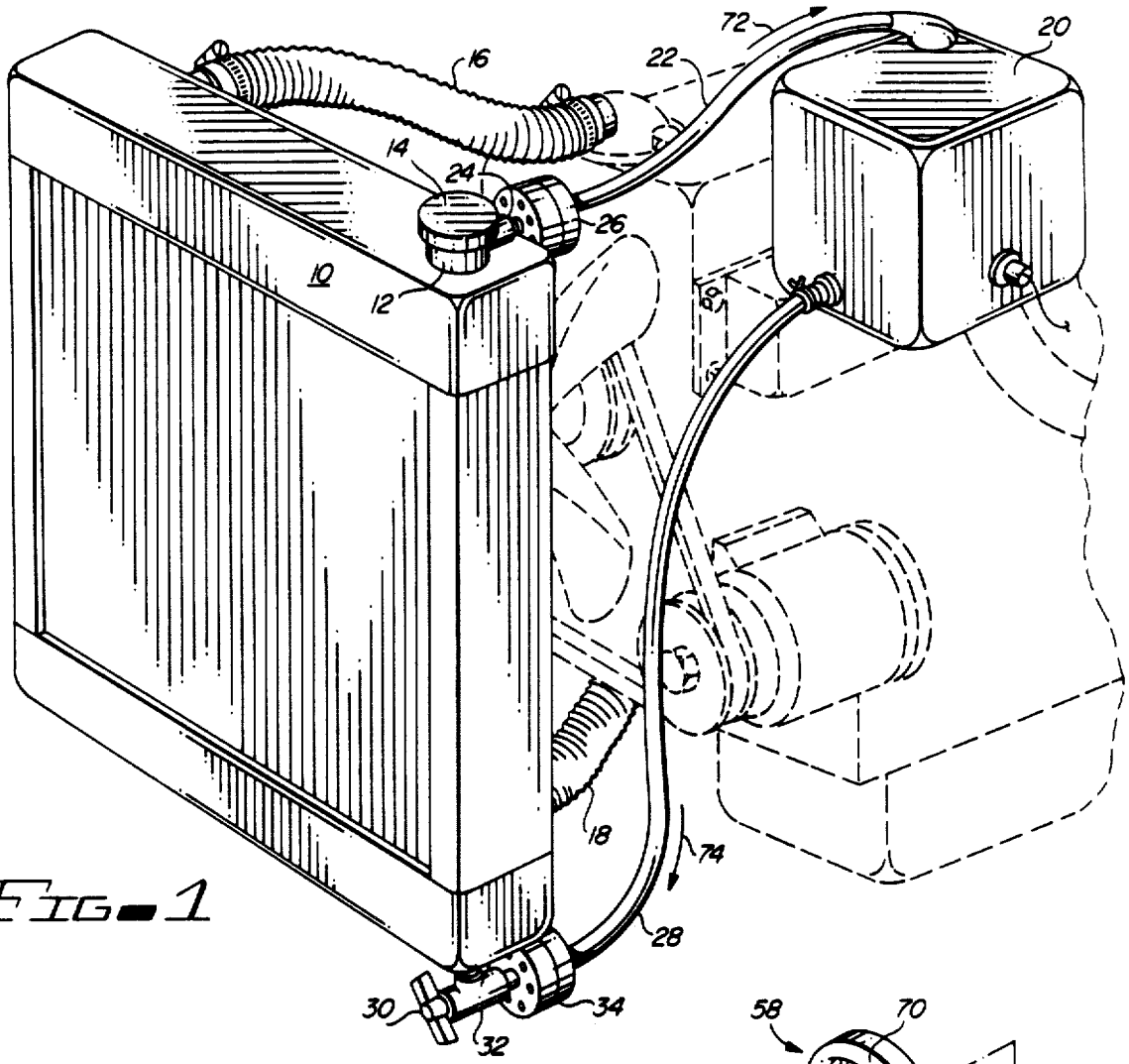
FIG. 1 illustrates an embodiment of the invention which can be added to a conventional engine cooling system.
Figure 2:
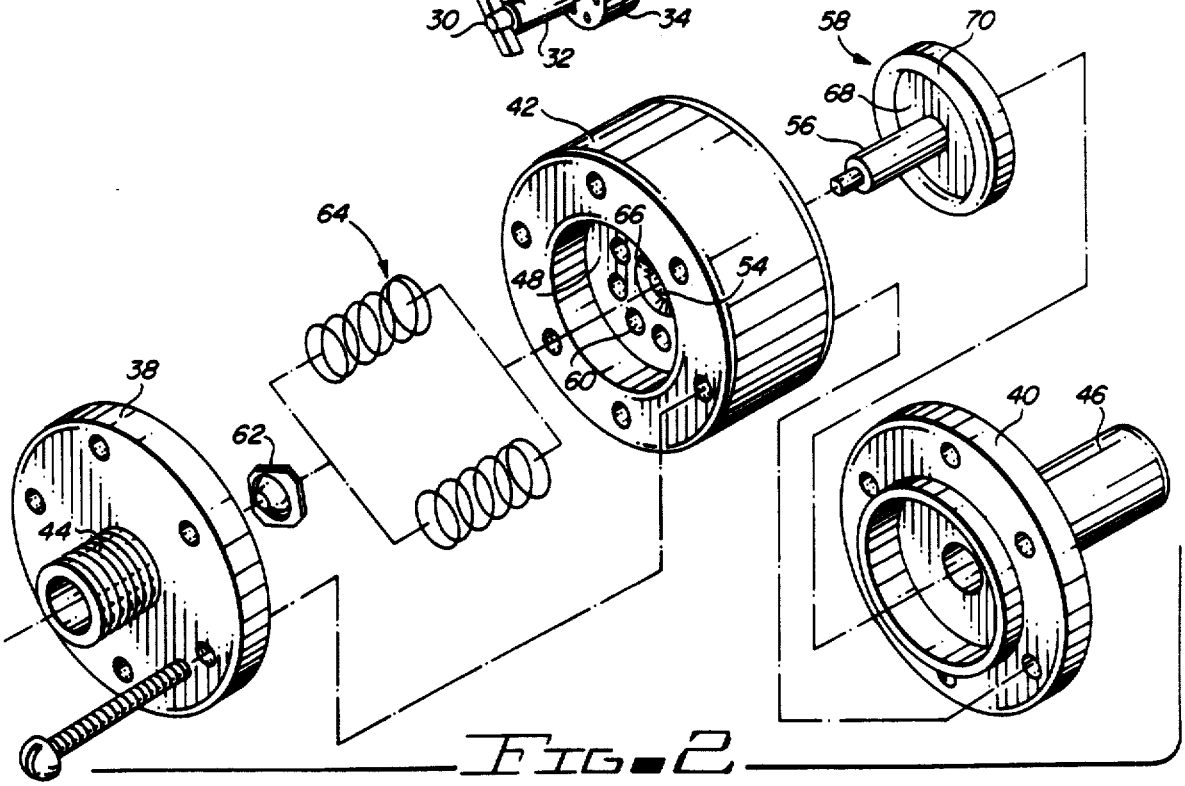
FIG. 2 represents an exploded perspective view of the component parts of one embodiment of a one way check valve utilized as an element of the present invention.
Figure 3:
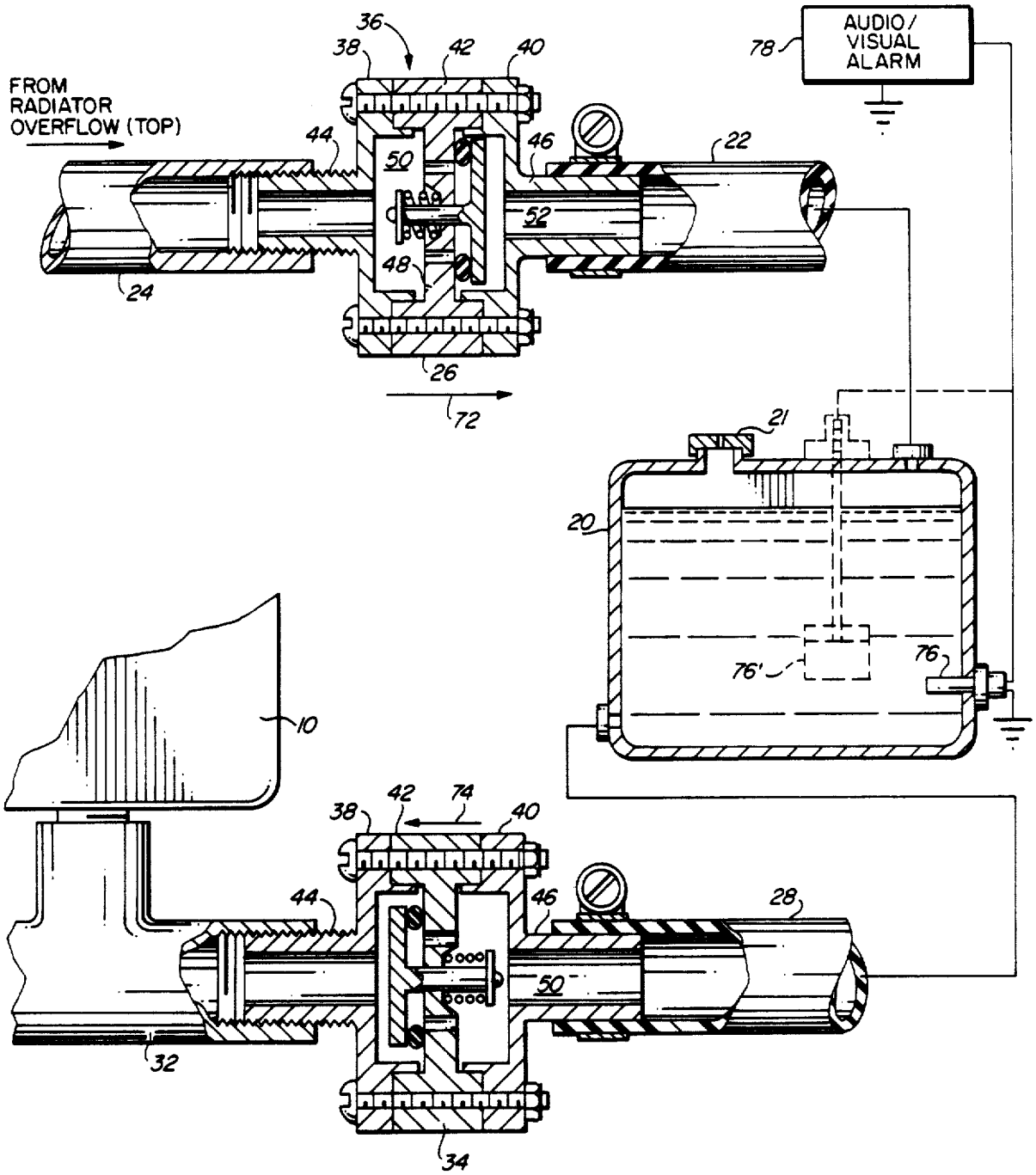
FIG. 3 represents a partially cutaway sectional view of the first and second one way check valve and the coolant reservoir of the present invention, particularly illustrating the internal structure of the system check valves and low coolant warning system.

Referring now to FIGS. 1, 2 and 3, an engine cooling system includes a radiator 10 having a filler neck 12 and a filler neck sealing cap 14 which forms a fluid tight seal with filler neck 12. A first fluid flow conduit 16 permits engine coolant to be transferred from the engine into the radiator while a second fluid flow conduit 18 permits engine coolant to be transferred from the radiator into the water jacket. The engine cooling system further includes a coolant reservoir 20 which is physically spaced apart from radiator 10 and elevated above the lower surface of radiator 10. Reservoir 20 includes a filler cap 21 having a vent hole for maintaining an ambient pressure level within reservoir 20. A coolant transfer conduit 22 is coupled at one end to a coolant overflow fitting 24 and at the opposite end to coolant reservoir 20.

A high pressure one way check valve 26 is coupled in series with coolant transfer conduit 22. In FIG. 1, check valve 26 is shown having one end coupled directly to radiator filler neck 12, while a second end is coupled to an end of coolant transfer conduit 22. Check valve 26 includes a biasing spring that determines the pressure level which permits coolant to be transferred from radiator 10 through coolant transfer conduit 22 into coolant reservoir 20. The spring biasing force is typically set such that check valve 26 opens when the pressure level within radiator 10 exceeds a predetermined value, such as 15 P.S.I.

A coolant refill conduit 28 is coupled at one end to a low point of reservoir 20 and at the opposite end to a low point in the engine cooling system, such as a low point on radiator 10. FIG. 1 depicts a radiator having a threaded aperture or port in the lowermost part thereof which includes a drain petcock 30. In a radiator of this type, petcock 30 is removed from the radiator and a "T"-fitting 32 is coupled as shown to that port. Petcock 30 is then reconnected to one of the ports of "T" 32 while a low pressure one way check valve 34 is coupled to the remaining port of "T" 32. The end of coolant refill conduit 28 is coupled to the inlet port of check valve 34.

Because of the comparatively high pressure levels existing at the radiator sides of check valves 26 and 34, FIG. 3 illustrates that tapered plumbers threads are utilized to provide a hermetic seal between check valves 26 and 34 and the fittings coupled to radiator 10. Any other equivalent sealed coupling means such as rubber hoses and hose clamps may also be used to provide the required hermetic coupling. It is important that the other fluid couplings between check valves 26 and 34 and reservoir 20 be fluid tight to prevent leakage, but since the pressure levels involved are significantly lower, normal hose clamp coupling systems can be used with little difficulty.

FIGS. 2 and 3 illustrate that check valves 26 and 34 are fabricated from identical and interchangeable components. Only the spring force provided by the biasing spring within the two check valves differs. With this single exception, the two check valves are interchangeable as long as each valve is coupled in the cooling system to provide fluid flow in the proper direction.

Each check valve includes a valve body 36 which defines the external housing of the valve and which includes a first end section 38, a second end section 40 and a center section 42. First end section 38 includes an inlet port 44 while second end section 40 includes an outlet port 46. Center section 42 includes dividing means in the form of a valve diaphragm 48 which divides the interior valve chamber of valve body 36 into an inlet chamber designated by reference number 50 and an outlet chamber designated by reference number 52. Valve diaphragm 48 further includes a centrally located aperture 54 for receiving the valve stem 56 of a valve element 58. A plurality of apertures, such as the aperture designated by reference number 60, are formed in valve diaphragm 48 at equal radial intervals.

Valve stem 56 of valve element 58 extends from outlet chamber 52 through aperture 54 into inlet chamber 50. Removable securing means in the form of a Tinnerman nut 62 is coupled to the reduced diameter end section of valve stem 56 and maintains a biasing means in the form of a spring 64 in place between nut 62 and bevelled recess 66 which surrounds aperture 54 in valve diaphragm 48. Bevelled recess 66 maintains the end of spring 64 centered with respect to aperture 54.

Valve element 58 further includes a valve surface 68 which is coupled to the end of valve stem 56. Sealing means such as an "O"-ring 70, a flat rubber disc or other means for forming a seal between the inner surface of valve surface 68 and valve diaphragm 48 is coupled to valve surface 68. In the normally closed position of the one way check valve, biasing spring 64 maintains valve element 58 sealed against valve diaphragm 48 so that fluid cannot flow from inlet chamber 50 into outlet chamber 52 until the pressure of the liquid within inlet chamber 50 exceeds a predetermined value fixed by the biasing force provided by spring 64. In one way check valve 26, spring 64 typically provides a predetermined biasing force sufficient to open one way check valve 34 at a predetermined pressure, such as 15 P.S.I. Spring 64 typically provides a predetermined biasing force sufficient to open one way check valve 34 at a predetermined pressure, such as ½ P.S.I.

As a result of the minimal biasing force provided by spring 64 in one way check valve 34, valve 34 if oriented in a vertical position will open and permit fluid flow if only a quantity of water sufficient to fill inlet chamber 50 and the cylindrical passageway within inlet port 44 is added.

FIGS. 2 and 3 indicate that a plurality of securing means such as nuts and bolts extend through the outer periphery of valve body 36 to couple together and form a fluid tight seal between first end section 38, second end section 40 and center section 42. Many other different types of securing means for accomplishing an equivalent function would be readily apparent to one of ordinary skill in the art. The arrows designated by reference number 72 and 74 indicate the direction of fluid flow through valves 26 and 34.

Coolant transfer conduit 22 may be coupled to coolant reservoir 20 at virtually any location, but it is preferable to couple conduit 22 to a comparatively high point in reservoir 20 as is depicted in FIG. 3. Coolant refill conduit 28 should be coupled to coolant reservoir 20 at a comparatively low point to permit the maximum amount of coolant within reservoir 20 to be available for transfer into radiator 10.

Coolant reservoir 20 may also include a coolant level sensing device 76 which extends into the interior of reservoir 20. When a sufficient amount of coolant has been transferred out of reservoir 20 such that the end of level sensing device 76 is exposed to the air, the voltage output across the electrical terminal of this device is altered. This voltage change actuates an audio/visual alarm 78 to indicate to the vehicle operator that the condition of the engine cooling system should be investigated immediately. The coolant level sensing device therefore indicates a potentially dangerous engine operating condition before a conventional engine overtemperature warning light and may prevent substantial engine damage as a result of such early warning.

In the preferred embodiment of the invention, an oil level probe model OL-1 manufactured by Sterling Technologies Incorporated of Southfield, Michigan is utilized as fluid level sensing device 76. Specifications from Sterling Technologies include installation instructions for their level sensing probe.

The operation of the present invention will now be described in connection with FIGS. 1 and 3. To initially fill the engine cooling system with coolant, filler cap 21 is removed and engine coolant is added through the filler neck of reservoir 20. Filler neck sealing cap 14 is removed from radiator 10 to permit air to be discharged from the engine cooling system as replacement fluid is added to the cooling system. Coolant being poured into the interior of coolant reservoir 20 flows through coolant refill conduit 28 into inlet chamber 50 of low pressure check valve 34. The head pressure created by the vertical spacing differential between the point at which conduit 28 is coupled to reservoir 20 and the elevation of check valve 34 exerts a force on valve surface 68 sufficient to overcome the opposing biasing force exerted by spring 64. Valve element 58 is therefore displaced into outlet chambers 52 and permits fluid to flow from the interior of coolant reservoir 20 through fitting 32 into the bottom of radiator 10. The coolant fills the lower section of radiator 10 and simultaneously flows through conduit 18 into the water jacket of the engine. Air displaced by the incoming coolant is vented through the open filler neck 12 of radiator 10. Filling the engine cooling system from the bottom in the manner disclosed above virtually completely purges air from the cooling system. If coolant reservoir 20 is placed at a sufficient height within the engine compartment with respect to filler neck 12 of radiator 10, the engine cooling system can be virtually completely filled by merely adding coolant to the interior of reservoir 20. When the engine cooling system has been filled with coolant, pressure cap 14 is replaced on filler neck 12 and filler cap 21 is replaced on reservoir 20.

As the engine is operated, the coolant within the cooling system is heated and expands. As the internal cooling system operating pressure exceeds 15 P.S.I., any air in the system is discharged through check valve 26 and coolant transfer conduit 22 into the vented interior of coolant reservoir 20. During successive engine operating cycles, all air within the cooling system will be completely purged and only liquid coolant will be discharged through check valve 26.

When the engine is shut down and the coolant temperature is reduced, a slight negative pressure is created within the cooling system, causing check valve 34 to open and transfer coolant from reservoir 20 into radiator 10.

A highly unique feature of the present invention is that the present cooling system configuration is capable of maintaining the cooling system completely full of coolant even though the cooling system may be leaking coolant from a defective fitting, hose or other cooling system component. A leak of this type generally presents itself only when the engine is operating, the cooling system temperature is elevated and the system is in at least a partially pressurized state to create a pressure differential across the cooling system leakage path. Such a leak produces a significant reduction in the system pressurization and permits the head pressure created by the elevation differential between coolant reservoir 20 and check valve 34 to exert a sufficient pressure across check valve 34 to permit a flow of coolant from reservoir 20 into the cooling system. In addition, the normal circulation of coolant from the lower portion of radiator 10 through conduit 18 to the engine driven water pump creates a negative pressure on the order of 4 P.S.I. in the vicinity of the place where conduit 18 is coupled to radiator 10. For this reason, it is advantageous to position check valve 34 in proximity to that negative pressure area to increase the pressure differential across check valve 34. Thus a flow of replacement coolant from reservoir 20 into radiator 10 is created both by the positive head pressure created by the vertical elevation difference between reservoir 20 and check valve 34 and also by the negative pressure created by coolant circulation from radiator 10 through conduit 18.

A cooling system leak causes the level of replacement coolant within reservoir 20 to fall and continuously indicates to one observing the coolant level in reservoir 20 the amount of coolant which has been discharged from the cooling system. Continued loss of coolant from reservoir 20 will ultimately expose level sensing device 76 to the atmosphere and will actuate audio/visual alarm 78 in the passenger compartment of the vehicle. The driver will be immediately alerted to shut down the engine and investigate the source of cooling system leakage.

As a result of the system operation as discussed above, the coolant stored within reservoir 20 is effectively available to the engine cooling system whether the engine is operating or shut down, the level of coolant within reservoir 20 accurately indicates the total quantity of coolant available to the engine and enables a vehicle operator or vehicular maintenance personnel to determine whether additional coolant is required by merely observing the quantity of coolant remaining with reservoir 20. It is not necessary to remove filler neck sealing cap 14 and visually inspect the coolant level within radiator 10.

The only moving parts utilized within this automatically refillable cooling system are contained within externally positioned, readily accessible and removeable one way check valves 26 and 34. Each check valve is easily disassembled by removing the nuts and bolts which couple the component parts of the valve together. Once the external housing has been disassembled, Tinnerman nut 62 can be removed permitting either repair or replacement of all valve elements as required. Since both check valves are fabricated from identical components except for spring 64, an extremely limited quantity of replacement parts can be stocked by aftermarket parts suppliers to permit inexpensive repairs to the system check valves. In the preferred embodiment of the present invention, every element of the check valve except for the "O"-ring 70 or equivalent sealing means, spring 64 and Tinnerman nut 62 are fabricated from a high temperature plastic such as Delrin plastic. These plastic components are readily and inexpensively manufactured by well known techniques and provide a highly durable valve which is readily made fluid tight.

The embodiment of the invention illustrated in FIG. 1 can be readily retrofitted to cooling systems of vehicles which include a remotely mounted coolant reservoir. If the radiator includes a petcock, the addition of "T"-fitting 32, check valve 34 and coolant refill hose 28 is sufficient to convert a standard prior art system to an automatically refillable system. Virtually all liquid engine cooling systems utilize a pressure cap having at least a single one way check valve which is actuated at about 15 P.S.I. to discharge coolant through coolant overflow fitting 24 and coolant transfer conduit 22 either onto the ground or into a coolant reservoir. Most automotive vehicles manufactured during the past 5–6 years utilize a pressure cap including first and second one way check valves in combination with coolant transfer conduit 22 and coolant reservoir 20. For both installations, it is not essential that the pressure cap be replaced and that a separate one way check valve 26 be added as depicted in FIG. 1. However, due to the significant advantages achieved by the utilization of check valve 26 of the specific configuration disclosed, a significantly more reliable automatically refillable cooling system can be achieved and the need to periodically replace the pressure cap will therefore be eliminated. If it is also desired to add a level sensor/alarm unit to an existing vehicular cooling system, such structure can readily be added with little difficulty.

The present invention may also be added to vehicular engine cooling systems during manufacture. In this case, a manufacturer may wish to redesign the radiator housing to eliminate filler neck 12 and coolant overflow fitting 24. The radiator housing may be designed to permit coupling of check valves 26 and 34 directly to threaded fittings attached to the radiator housing itself. In this configuration, a separate pressure release valve is fitted to the engine cooling system at a comparatively high point, such as the upper portion of radiator 10, so that such a valve may be actuated to permit air to be purged from the engine cooling system as coolant is initially added to the engine through coolant reservoir 20.

Figure 4:
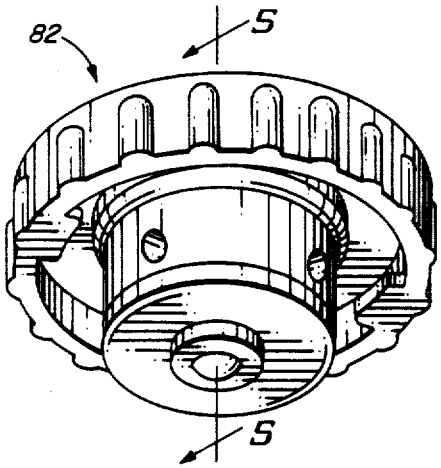
FIG. 4 is a perspective view of a radiator pressure cap including a one way check valve for use in combination with the present invention.
Figure 5:
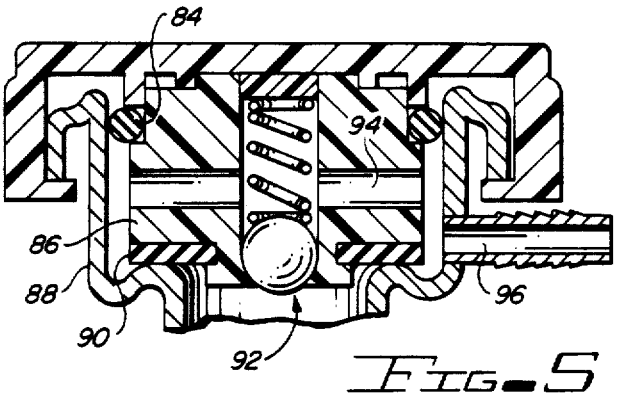
FIG. 5 is a sectional view of the pressure cap depicted in FIG. 4, taken along section line 4—4.

Referring now to FIGS. 4 and 5, a high pressure one way check valve 82 is disclosed which may be utilized in connection with radiator designs of the type depicted in FIG. 1, rather than utilizing a separate outboard check valve 26. U.S. Pat. No. 4,079,855 (Avrea) discloses a monolithic radiator cap which is fabricated from plastic and which includes "O"-ring sealing means. The fabrication of that cap and cap 82 are similar. That patent is therefore incorporated herein by reference.

Check valve 82 includes sealing means in the form of an "O"-ring 84 which provides an hermetic seal between the outer cylindrical section 86 of valve 82 and the inner cylindrical section of filler neck 88. The lower section of valve cylindrical section 86 is tightly sealed to filler neck 88 by gasket 90. A spring biased ball check valve assembly 92 permits either air or coolant to be discharged from the radiator through passageway 94 and out of coolant overflow fitting 96 when a predetermined pressure, such as 15 P.S.I., is exceeded.

Figure 6:
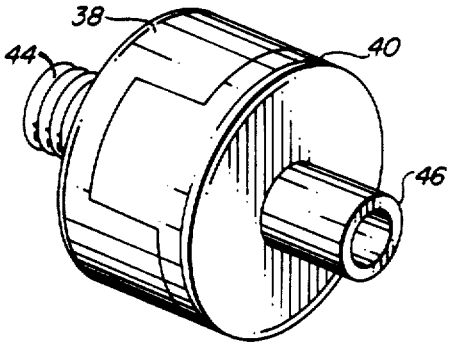
FIG. 6 is a perspective view of a second embodiment of a one way check valve of the type illustrated in FIG. 2.
Figure 7:
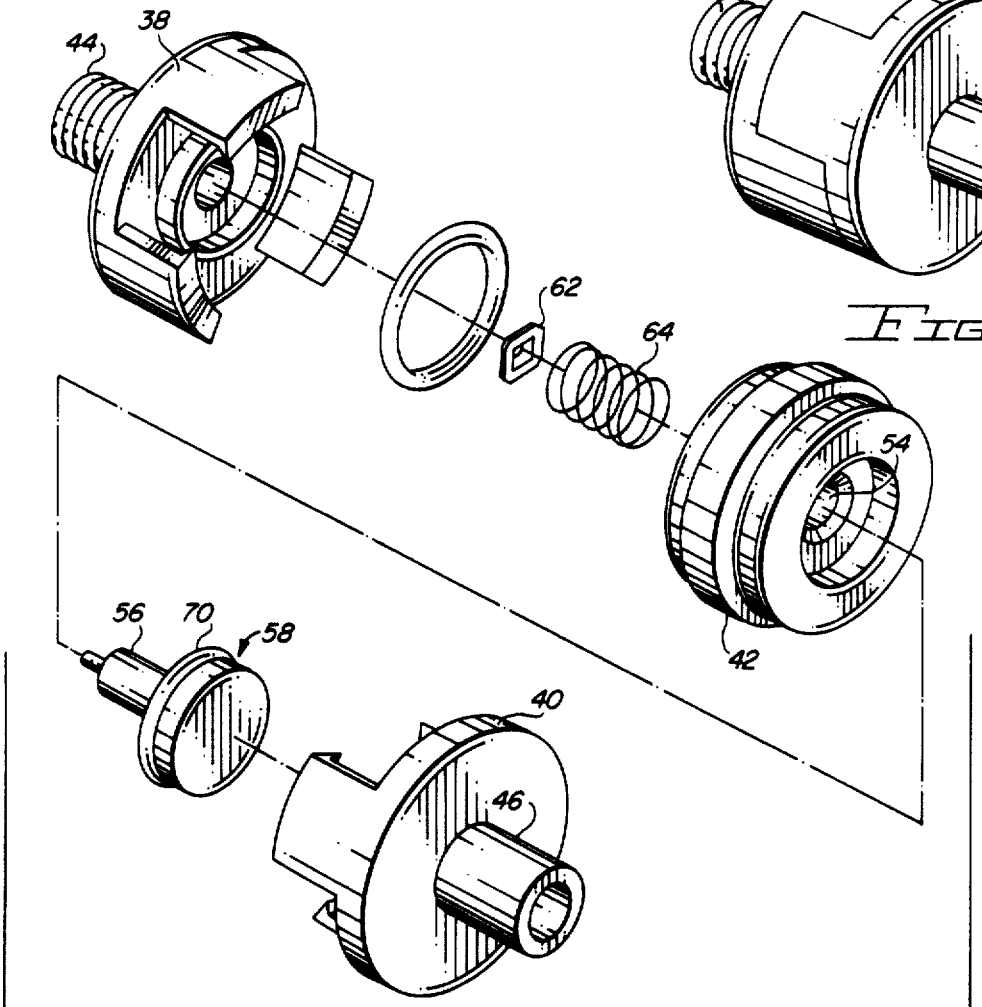
FIG. 7 is an exploded perspective view of the one way check valve illustrated in FIG. 6.

Referring now to FIGS. 6 and 7, a second embodiment of check valves 26 and 34 is illustrated. In this embodiment, end sections 38 and 40 include three spaced apart clips which can be displaced over the centrally located, raised exterior section of valve center section 42. This modified valve embodiment eliminates the requirement for bolt and nut securing means as utilizes in the previously discussed one way check valve embodiment. The FIG. 6 embodiment can be manufactured at less cost and can be assembled and disassembled more readily than the previously discussed embodiment.

Figure 8A:
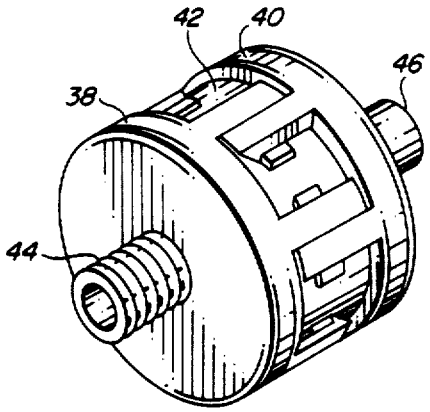
FIGS. 8A and 8B depict a third embodiment of a one way check valve of the type illustrated in FIG. 2.
Figure 8B:
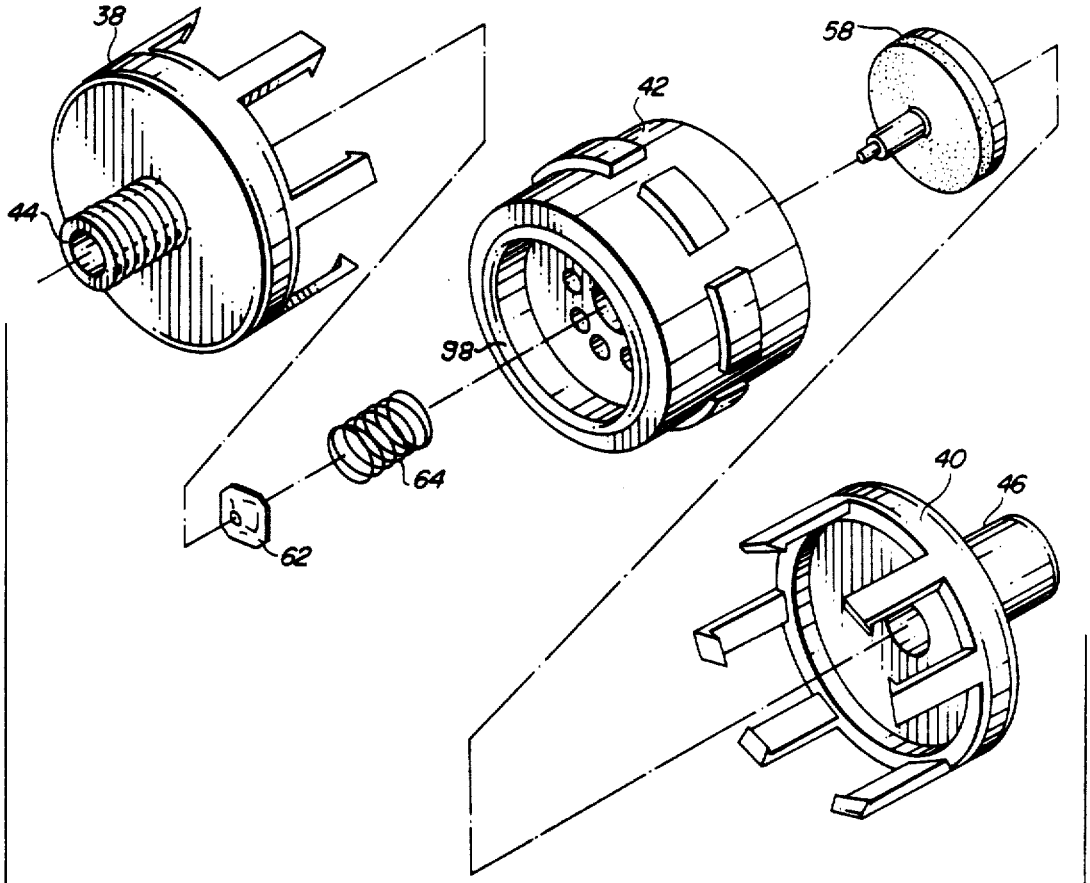

FIG. 8 discloses yet another embodiment of the one way check valves depicted in FIGS. 1–3. End sections 38 and 40 each include six clips coupled at equal intervals around the periphery of each end section. Center section 42 includes a raised ring having a plurality of six notches. The width of each notch is slightly in excess of the width of the clips extending from end sections 38 and 40. An "O"-ring sealing device 98 is positioned within a notched cutout on each side of center section 42 to provide an hermetic seal between end sections 38 and 40 and center section 42.

The clips of a single end section are slipped through the notches in center section 42 and a compressive force is applied between the end section and the center section such that the end section can be rotated to engage the clips on the raised section of center section 42. The second end section is then coupled to center section 42 by using a similar procedure. The unit is disassembled by using a procedure opposite to that described above.

It will be apparent to those skilled in the art that the disclosed automatically refillable engine cooling system may be modified in numerous ways and may assume many embodiments other than the preferred forms specifically set out and described above. For example, check valves 26 and 34 may be positioned in any location in series with coolant transfer conduit 22 or coolant refill conduit 28, although optimum operation is obtained when check valve 34 is located at the greatest possible distance below reservoir 20. A great variety of other check valve designs may be utilized to achieve the function discussed in connection with check valves 26 and 34. In addition, coolant transfer conduit 22 does not neccessarily have to be connected to the radiator of the engine cooling system, but might be connected at a relatively high location to another cooling system component. As indicated by the dotted line depiction in accumulator 20 of FIG. 3, a float valve coolant level sensor assembly 76' may be substituted for electronic sensor 76. Sensor 76' is coupled by a two-conductor wire to alarm 78. Accordingly, it is intended by the appended claims to cover all such modifications of the invention which fall within the true spirit and scope of the invention.

I claim:

1. Apparatus for modifying an existing engine liquid cooling system to automatically replace coolant discharged from a leak as the engine operates, said cooling system comprising:

a. a radiator having upper and lower surfaces and a horizontal centerline lying equidistant between the upper and lower surfaces;

b. first means for transferring coolant from the engine to the said radiator;

c. second means for transferring coolant from said radiator to the engine;

d. a filler neck disposed at a high point on said radiator;

e. means for sealing said filler neck to the ambient atmosphere;

f. a coolant overflow fitting coupled to said filler neck;

g. a [threaded] receptacle coupled to a low point in said radiator;

h. a coolant reservoir physically spaced apart from said radiator, vented to the atmosphere, and having a lower surface positioned above the centerline of said radiator and an upper surface positioned in proximity to or above the upper surface of said radiator, said reservoir including a supply of coolant;

i. a coolant transfer conduit having a first end coupled to said overflow fitting and a second end coupled to said reservoir; and j. a first one way check valve coupled in series with the fluid flow path from said radiator through said coolant transfer conduit into said reservoir for permitting fluid flow from said radiator into said reservoir when the pressure within said cooling system exceeds a predetermined maximum value;

said [cooling system modification] apparatus comprising:

(a) a second one way check valve having an input port and an output port coupled in liquid communication with said [drain cock and in series with said coolant refill conduit] *receptacle* and located between said coolant reservoir and said radiator for transferring coolant from said reservoir into said radiator when the pressure differential across said *second* check valve exceeds a predetermined value; and (b) a coolant refill conduit having a first end coupled to a low point in said reservoir and a second end coupled to said second one way check valve;

whereby a reduction in the cooling system operating pressure caused by a cooling system leak opens said second check valve and transfers coolant from said reservoir into said cooling system.

2. The apparatus of claim 1 wherein said filler neck includes a lip and wherein said [sealing means] *means for sealing* includes a filler neck sealing cap.

3. The apparatus of claim 2 wherein said first check valve is coupled between said overflow fitting and said coolant transfer conduit.

4. The apparatus of claim 3 wherein said second check valve is positioned in close proximity to said [threaded] receptacle.

5. The apparatus of claim 2 wherein said first check valve includes a spring biased check valve coupled to said [pressure] *sealing* cap and including a valve seat for forming a seal with the interior of said filler neck.

6. The apparatus of claim 1 wherein said [second] coolant [transfer means] *refill conduit* is coupled to said radiator at a low point on said radiator.

7. The apparatus of claim 1 wherein said radiator includes a drain port coupled to said [threaded] aperture *receptacle*.

8. The apparatus of claim 7 wherein one end of said second check valve is coupled to said [radiator] drain port.

9. The apparatus of claim 1 wherein said second check valve includes:

a. a valve body having an interior chamber, an input port and an output port;

b. *dividing* means positioned within said valve body for dividing said chamber into an inlet chamber and an outlet chamber, said dividing means including an aperture;

c. valve means positioned within said outlet chamber and displaceable between first and second positions for terminating fluid flow through said aperture when in the first position and for permitting fluid flow through said aperture when in the second position; and d. *biasing* means coupled to said valve means for biasing said valve means into the first position, whereby said valve means is displaced from the first position into the second position when the pressure differential across said dividing means exceeds a predetermined value.

10. The apparatus of claim 9 wherein said dividing means includes a second aperture and wherein said valve means includes:

a. a valve surface; and b. a valve stem coupled to said valve surface and extending through the second aperture in said dividing means.

11. The apparatus of claim 10 wherein said biasing means includes a spring coupled to said valve stem.

12. The apparatus of claim 11 wherein said spring surrounds said valve stem and abuts said dividing means.

13. The apparatus of claim 12 wherein the end of said valve stem includes means for retaining said spring between the end of said valve stem and said dividing means.

14. The apparatus of claim 13 wherein the biasing force exerted by said spring between said valve stem and said dividing means determines the pressure differential at which said valve means is displaced between the first and second positions.

15. The apparatus of claim 13 wherein said second aperture is positioned in the center of said dividing means.

16. The apparatus of claim 1 wherein the upper surface of said coolant reservoir is positioned at least as high as said filler neck.

17. The apparatus of claim 2 wherein said filler neck includes a cylindrical inner section and wherein said filler neck sealing [means] cap includes circular sealing means coupled to said cap for engaging the cylindrical inner section of said filler neck near the open end thereof and means for radially continuously supporting said circular sealing means to maintain a sealing engagement between said [pressure] cap and the cylindrical inner section of said filler neck when said cap is coupled to said filler neck.

[18. The apparatus of claim 1 wherein said second check valve is coupled to said coolant refill conduit in proximity to the second end thereof.]

19. The apparatus of claim 1 further including coolant level sensing means coupled to said coolant reservoir for activating an alarm when the coolant level in said reservoir drops below a predetermined quantity.

20. A cooling system for an internal combustion engine comprising:

a. a radiator including
   i. first means for transferring coolant from said engine to said radiator;
   ii. second means for transferring coolant from said radiator to said engine;

b. a coolant reservoir physically spaced apart from said radiator, elevated above the lower surface of said radiator and including an upper surface positioned above the upper surface of said radiator and a supply of replacement coolant;

c. a coolant transfer conduit having a first end coupled to a high point in said cooling system and a second end coupled to said reservoir;

d. a first one way check valve coupled in series with the fluid flow path from said radiator through said coolant transfer conduit into said reservoir for permitting fluid flow from said radiator into said reservoir when the pressure within said cooling system exceeds a predetermined maximum value;

e. a second one way check valve having an input port and an output port *and* coupled in liquid communication with [said drain cock and in series with said coolant refill conduit] *a low point in said radiator* and located between said coolant reservoir and said radiator for transferring coolant from said reservoir into said radiator when the pressure differential across said *second* check valve exceeds a predetermined value; and f. a coolant refill conduit having a first end coupled to a low point in said reservoir and a second end coupled to said second one way check valve.

21. The cooling system of claim 20 wherein said reservoir includes a filler neck.

22. The cooling system of claim 21 further including means coupled to a high point in said cooling system for selectively depressurizing said system to permit air to be purged as said system is initially filled.

23. The apparatus of claim 21 wherein said second check valve includes:

a. a valve body having an interior chamber, an input port and an output port;

b. *dividing* means positioned within said valve body for dividing said chamber into an inlet chamber and an outlet chamber, said dividing means including an aperture;

c. valve means positioned within said outlet chamber and displaceable between first and second positions for terminating fluid flow through said aperture when in the first position and for permitting fluid flow through said aperture when in the second position; and d. *biasing* means coupled to said valve means for biasing said valve means into the first position, whereby said valve means is displaced from the first position into the second position when the pressure differential across said dividing means exceeds a predetermined value.

24. The apparatus of claim 23 wherein said dividing means includes a second aperture and wherein said valve means includes:

a. a valve surface; and b. a valve stem coupled to said valve surface and extending through the second aperture in said dividing means.

25. The apparatus of claim 24 wherein said biasing means includes a spring coupled to said valve stem.

26. The apparatus of claim 25 wherein said spring surrounds said valve stem and abuts said dividing means.

27. The apparatus of claim 26 wherein the end of said valve stem includes means for retaining said spring between the end of said valve stem and said dividing means.

28. The apparatus of claim 27 wherein the biasing force exerted by said spring between said valve stem and said dividing means determines the pressure differential at which said valve means is displaced between the first and second positions.

29. The method for modifying the cooling system of an internal combustion engine having a remotely positioned coolant accumulator to enable the supply of coolant circulating within said cooling system to be replenished as said engine is operating, said cooling system comprising:

a. a radiator including:
   i. first means for transferring coolant from said engine to said radiator;
   ii. second means for transferring coolant from said radiator to said engine;
   iii. a filler neck disposed at a high point in said cooling system;
   iv. a coolant overflow fitting coupled to said filler neck;

b. a coolant reservoir physically spaced apart from said radiator and vented to the atmosphere, said reservoir having a lower surface positioned above the lower surface of said radiator and including a supply of replacement coolant;

c. a coolant transfer conduit having a first end coupled to said overflow fitting and a second end coupled to said reservoir;

d. a pressure cap for sealing said filler neck to the ambient atmosphere and for venting said radiator to the atmosphere when the internal radiator pressure exceeds a predetermined value;

said method comprising the steps of:

a. connecting one end of a coolant refill conduit to a low point in said reservoir and a second end to a low point in said radiator; and b. connecting a low pressure one way check valve in series with said coolant refill conduit for enabling fluid to flow from said reservoir into said radiator when the pressure differential across said check valve exceeds a predetermined value, whereby depressurization of said cooling system causes replacement coolant to flow from said reservoir through said coolant [replenishment] *refill* conduit into said radiator as said engine is operating.

30. The method of claim 29 wherein said pressure cap includes a one way check valve for permitting fluid flow from said radiator through said coolant overflow fitting and said coolant transfer conduit into said [accumulator] *coolant reservoir* when the pressure within said cooling system exceeds a predetermined maximum value.

31. The method of claim 29 comprising the further steps of replacing said pressure cap with filler neck sealing means and connecting a high pressure one way check valve in series with said coolant transfer conduit for permitting fluid flow from said radiator into said [accumulator] *coolant reservoir* when the pressure within said cooling system exceeds a predetermined maximum value.

32. The method of claim 31 wherein said high pressure and said low pressure check valves are fabricated from [identical] *analogous* components and each check valve includes:

a. a valve body having an interior chamber, an input port and an output port;

b. *dividing* means positioned within said valve body for dividing said chamber into an inlet chamber and an outlet chamber, said dividing means further including an aperture;

c. valve means positioned within said outlet chamber and displaceable between first and second positions for terminating fluid flow through said aperture when in the first position and for permitting fluid flow through said aperture when in the second position; and d. *biasing* means coupled to said valve means for biasing said valve means when in the first position, whereby said valve means is displaced from the first position into the second position when the pressure differential across said dividing means exceeds a predetermined value.

33. The method of claim 32 wherein said dividing means includes a second aperture and wherein said valve means includes:

a. a valve surface; and b. a valve stem coupled to said valve surface and extending through the second aperture and said dividing means.

34. The method of claim 33 wherein said biasing means includes a spring coupled to said valve stem.

35. The method of claim 34 wherein said spring surrounds said valve stem and abuts said dividing means and wherein the end of said valve stem includes means for retaining said spring between the end of said valve stem and said dividing means.

36. The method of claim 35 wherein the biasing force exerted by said spring between said valve stem and said dividing means determines the pressure differential at which said valve means is displaced between the first and second positions.

37. The method of claim 36 wherein the spring disposed within said high pressure check valve is substantially stronger than the spring disposed within said lower pressure check valve.

* * * * *

UNITED STATES PATENT AND TRADEMARK OFFICE

CERTIFICATE OF CORRECTION

PATENT NO. : Re. 32,434

DATED : 9 June 1987

INVENTOR(S) : Walter C. Avrea

It is certified that error appears in the above—identified patent and that said Letters Patent is hereby corrected as shown below:

On the Title page:

Change "[76] Inventor: Walter C. Avrea, 1405 Whalers Way, Tempe, Arizona 85283" to --[76] Inventor: Walter C. Avrea, 1071 East Sandpiper Drive, Tempe, Arizona 85283--.

Signed and Sealed this

Fifth Day of September, 1989

*Attest:*

DONALD J. QUIGG

*Attesting Officer*

*Commissioner of Patents and Trademarks*